United States Patent [19]

Masante et al.

[11] Patent Number: 5,262,020
[45] Date of Patent: Nov. 16, 1993

[54] HYDROMETALLURGICAL METHOD OF PRODUCING METALLIC LEAD FROM MATERIALS CONTAINING OXIDES, PARTICULARLY FROM THE ACTIVE MATERIAL OF ACCUMULATORS

[75] Inventors: Roberto Masante, Casalborgone; Claudio Serracane, Villastellone, both of Italy

[73] Assignee: M.A. Industries, Inc., Peachtree City, Ga.

[21] Appl. No.: 994,457

[22] Filed: Dec. 21, 1992

Related U.S. Application Data

[63] Continuation of Ser. No. 850,287, Mar. 12, 1992.

[30] Foreign Application Priority Data

Mar. 13, 1991 [IT] Italy .............................. 000177 A/91

[51] Int. Cl.$^5$ ................................................ C25C 1/18
[52] U.S. Cl. ............................................... 204/114
[58] Field of Search ........................................ 204/114

[56] References Cited

U.S. PATENT DOCUMENTS 4,460,442 7/1984 Ducati .................... 204/114

FOREIGN PATENT DOCUMENTS

| 0028839 | 5/1981 | European Pat. Off. . |
| 0038366 | 10/1981 | European Pat. Off. . |
| 0089185 | 9/1983 | European Pat. Off. . |
| 0096662 | 12/1983 | European Pat. Off. . |
| 0238714 | 9/1987 | European Pat. Off. . |
| 2505876 | 11/1982 | France . |
| 2185348 | 7/1987 | United Kingdom . |

*Primary Examiner*—T. M. Tufariello
*Attorney, Agent, or Firm*—Kilpatrick & Cody

[57] ABSTRACT

In a method of producing metallic lead from a material including lead dioxide and/or metallic lead, including a step for dissolving the lead contained in the material and an electrolysis step for the cathodic deposition of the dissolved lead, the dissolving step is carried out with the use of an acid electrolyte in the presence of a redox couple which has a potential between its oxidised and reduced oxidation states such as to reduce the lead dioxide and/or oxidise the lead and which can be regenerated during the step for the electrochemical deposition of the dissolved lead. The method is used, in particular, for the production of lead from the active material of spent accumulators.

13 Claims, No Drawings

HYDROMETALLURGICAL METHOD OF PRODUCING METALLIC LEAD FROM MATERIALS CONTAINING OXIDES, PARTICULARLY FROM THE ACTIVE MATERIAL OF ACCUMULATORS

This is a continuation of application Ser. No. 850,287 filed on Dec. 12, 1982.

The present invention relates to a completely wet hydrometallurgical method of producing metallic lead from a material including lead dioxide and/or metallic lead, particularly from the active material of spent lead accumulators.

The active material of accumulators, which is normally in the form of a paste, is constituted essentially by $PbO_2$, $Pb$, $PbSO_4$ and organic additives.

In methods of recovering the lead, the lead sulphate is normally transformed, in a step known as desulphurisation, into a compound ($PbCO_3$, $PbO$, etc.) which can be dissolved during the subsequent steps.

The desulphurised pastes are attacked by an acid solution to remove all the soluble Pb.

Currently all the known methods desulphurise the active material of spent batteries by reacting it with carbonates or hydroxides; the sulphate is changed into a soluble form [$Na_2SO_4$, $(NH_4)_2SO_4$] and removed from the pastes.

The carbonated pastes may be treated by a thermal process at fairly low temperatures (800°-900° C.) and produce less emissions than untreated pastes because of the absence of oxides of sulphur.

Nevertheless, the heat process is still highly polluting and the management of the by-products is difficult.

Alternatives to the pyrometallurgical method are constituted by electrochemical methods of extracting the Pb.

These methods dissolve the Pb compounds in suitable solutions which, when subjected to electrolysis, deposit the Pb on the cathode in the pure metallic form; because this operation takes place in aqueous solution, there are no problems with fumes or dust and the environmental impact is therefore considerably less.

The main problem in treating the pastes by hydrometallurgical methods is constituted by the $PbO_2$ in the active material of the battery.

In fact $PbO_2$ is very resistant to attack by the acids normally used in these methods.

Many methods have been proposed for making the $PbO_2$ soluble and these are hereinafter given in chronological order:

C. E. Tucker in U.S. Pat. No. 1,148,062
W. C. Smith in U.S. Pat. No. 1,752,356
J. H. Calbeck in U.S. Pat. No. 1,911,604
A. F. Gaumann in U.S. Pat. No. 4,107,007
M. F. Elmore in U.S. Pat. No. 4,118,219
U. Ducati in U.S. Pat. No. 4,460,442
Fracchia in European Patent Application 313153

The methods which propose roasting at high temperatures in a reducing atmosphere suffer from the same problems as the above-mentioned thermal processes (dust, fumes, etc.).

All the wet methods, on the other hand, address the problem by means of reactions which are unsuitable since, in some cases, they lead to the formation of $PbSO_4$ which has to be sent back to the desulphurisation step and, in other cases, they use up reagents which cannot be regenerated ($H_2O_2$, $Pb$, $NH_4HSO_3$) with the result that production costs are increased.

In order to avoid the problems and disadvantages of the known methods, the subject of the invention is a method of producing metallic lead from a material including lead dioxide and/or metallic lead, including a step for dissolving the lead included in the material and an electrolysis step for the cathodic deposition of the dissolved lead, characterised in that the dissolving step is carried out with the use of an acid electrolyte in the presence of a redox couple having, between its oxidised and reduced oxidation states, a potential such as to reduce the lead dioxide and/or to oxidise the lead and which can be regenerated during the step for the electrochemical deposition of the dissolved lead.

The term "redox couple" as used in the present description is intended to include elements or compounds of organic or inorganic origin which exist in oxidised and reduced forms and which have potentials between their two states such as to reduce the $PbO_2$ and/or oxidise the lead according to the reactions:

$$A^y + Pb \rightarrow Pb^{2+} + A^x$$

$$A^x + PbO_2 + 2H^+ \rightarrow Pb^{2+} + A^y + 2H_2O$$

and which can also be regenerated at the electrodes of a normal electrolytic cell without being co-deposited or degraded.

Preferably, the redox couple includes a metal which has several valency states, such as the elements belonging to the following groups of the periodic table:

the Ti group IVB, the V group VB, the Cr group VIB, the Mn group VIIB, the Fe triad group VIII, and the lanthanides.

Of these Ti, V, Ce and Fe have been identified as preferable.

The method is used in particular for producing and recovering Pb from the active material of spent Pb accumulators which typically includes Pb, $PbO_2$ and $PbSO_4$.

In this case, according to a first embodiment, the method includes a first step for desulphurising the active material by carbonation, followed by the treatment of the carbonated pastes with an acid solution of fluoboric, fluosilicic, sulphamic or $C_1$-$C_4$ alkanesulphonic acid.

In this step the reactions which take place are:

$$PbCO_3 + 2H^+ \rightarrow Pb^{++} + CO_2 + H_2O \quad \text{1)}$$

$$PbO + 2H^+ \rightarrow Pb^{++} + H_2O \quad \text{2)}$$

The PbO and the $PbCO_3$ dissolve very quickly under a wide range of operating conditions.

The acid solution containing the dissolved lead is separated from the residue and supplied to the step for the electrochemical deposition of the lead.

The separated residue, which is constituted mainly by $PbO_2$, Pb, and organic substances, is supplied to the subsequent dissolving step.

During this step, the residue is treated again with an acid solution to which a redox pair $Me^x/Me^y$ ($Me^x$ reduced, $Me^y$ oxidised), which preferably includes a metal selected from those mentioned above and can reduce the $PbO_2$ and oxidise the Pb to $Pb^{++}$, has been added.

$$4H^+ + PbO_2 + \frac{2}{y-x} Me^x \rightarrow \frac{2}{y-x} Me^y + Pb^{++} + 2H_2O$$

$$Pb + \frac{2}{y-x} Me^y \rightarrow Pb^{++} + \frac{2}{y-x} Me^x$$

The reactions take place very quickly and at ambient temperature and the added metal is not used up during the process.

Typically, the metal included in the redox couple is added to the electrolyte at a concentration of from 0.01 to 10M.

The electrolyte used may be an aqueous solution of an acid having the characteristics that:
it can keep a large amount of $Pb^{2+}$ in solution,
it does not react with the redox system,
it is not degraded by contact with the electrodes during the electrolysis stage, and
it allows the electrolysis step to be carried out under favourable conditions.

Preferably, the acid electrolyte is an aqueous solution of an acid selected from fluoboric, fluosilicic, sulphamic and $C_1$-$C_4$ alkanesulphonic acids at a concentration of up to 800 g/liter. For fluoboric acid in particular, the preferred concentration is from 20 to 500 g/liter.

At this point the solution containing $Pb^{++}$ and the redox couple $Me^x/Me^y$ is sent for electrolysis which, as well as depositing lead at the cathode, also re-establishes the correct $Me^x/Me^y$ ratio according to the reactions:

$$Me^y + ne^- \rightarrow Me^x \ (n=x-y)$$

$$Pb^{++} + 2e^- \rightarrow Pb$$

A redox couple which can be regenerated at the anode of the electrolysis cell may, however, be used.

Alternatively, the redox couple may be regenerated at least partially by putting the electrolyte of the dissolving step in contact with metallic lead in series with the electrochemical deposition stage. Scrap lead of low commercial value may to advantage be used for this purpose.

Alternatively, the dissolving step in the presence of a redox couple which characterises the present invention may be carried out as the first step of the method of treating the active material of spent accumulators, that is, directly on material which has not been desulphurised and includes $PbSO_4$, $PbO_2$ and Pb.

In this case, once the dissolving has been carried out, the acid solution containing dissolved lead and the redox couple can be supplied directly to the step for the electrochemical deposition of the lead and the sulphurated residue ($PbSO_4$) can be supplied to the steps for desulphurisation by carbonation and dissolving in acid.

The advantages of the introduction of the electrochemical couple may be summarised as follows:

I. No reagents are used up, and only the electrical energy necessary for re-establishing the pair is used.

II. No undesired elements or compounds are added (e.g. for the $NH_4HSO_3$ necessary to reduce the $PbO_2$, ammonium ions are introduced).

III. No gases are evolved and no foam or spray is therefore formed.

EXAMPLE 500 g of carbonated pastes with a Pb content of about 70% (in the form of: $PbCO_3$ 40÷50%, PbO 3÷7%, $PbO_2$ 35÷40%, Pb 4÷7%, inert substances 4÷6%) were placed in contact with 3 l of spent electrolyte containing:
25 g/l of Pb
175 g/l of free $HBF_4$ After stirring for 1 h and then filtering and washing, this produced 230 g of a residue composed of:

| Water | 17.5% |
|---|---|
| Pb | 61.5% (as $PbO_2$ = 71%) |
| inert substances | 8.2% | and 2.91 l of electrolyte containing:
89 g/l of Pb
116 g/l of free $HBF_4$
from which 185 g of metallic Pb were extracted by electrolysis, returning the electrolyte to its initial condition.

The residue (230 g containing 71% of $PbO_2$) was attacked with 2 l of a solution containing:
25 g/l of Pb
15 g/l of $Ti^{3+}$
30 g/l of free $HBF_4$ After contact for 15 minutes the mixture was filtered. The solids were constituted by the inert substances and the solution was sent for electrolysis.

Electrolysis with a 50% average distribution of the current between deposition and regeneration produced 140 g of Pb and reduced the $Ti^{4+}$ to $Ti^{3+}$ again; the fluoboric solution was thus ready for a subsequent step.

The cell used for extracting the Pb included cathodes of Pb or other metals and insoluble anodes.

What is claimed is:

1. A method of producing metallic lead from a material containing lead using an electrolysis system having a cathode and an anode, said method comprising:
   dissolving the lead contained in the material with the use of an acid electrolyte in the presence of a redox couple having, between its oxidised and reduced oxidation states, a potential such as to reduce lead dioxide and to oxidise lead, said material being selected from the group consisting of a material including lead dioxide, a material including metallic lead, and a material including lead dioxide and metallic lead; and
   electrochemically depositing the dissolved lead at said cathode while regenerating the redox couple.

2. A method according to claim 1, wherein the redox couple includes a metal selected from the group consisting of metals belonging to the following groups of the periodic table: the Ti group IVB, the V group VB, the Cr Group VIB, the Mn group VIIB, the Fe triad group VIII, and the lanthanides.

3. A method according to claim 2, wherein the redox couple includes a metal selected from the group consisting of titanium, vanadium, cerium and iron.

4. A method according to claim 2, wherein the redox couple is regenerated at the cathode during the step for the electrochemical deposition of the lead.

5. A method according to claim 2, wherein the couple is regenerated at the anode during the step for the electrochemical deposition of the lead.

6. A method according to claim 1, wherein the redox couple is at least partially regenerated by putting the electrolyte of the dissolving step, including the redox couple, in contact with metallic lead in series with the electrochemical deposition step.

7. A method according to claim 2, wherein the metal included in the redox couple is added to the electrolyte at a molar concentration of from 0.01 to 10%M.

8. A method according to claim 1, wherein the electrolyte is an aqueous acid solution including an acid selected from the group consisting of fluoboric, fluosilicic, sulphamic and $C_1$-$C_4$ alkanesulphonic acids at a concentration of up to 800 g/l.

9. A method according to claim 1, wherein the material which is subjected to the dissolving step is derived from the active material of spent lead accumulators.

10. A method according to claim 9, additionally comprising the steps of:
   desulphurising the active material of spent lead accumulators by carbonation,
   treating the carbonated active material with an acid solution to dissolve the carbonates, and
   supplying the undissolved portion to the dissolving step.

11. A method according to claim 10, wherein the treating step is carried out with a solution of an acid selected from the group consisting of fluoboric, fluosilicic, sulphamic and $C_1$-$C_4$ alkanesulphonic acids.

12. A method according to claim 1, wherein the material which is subjected to the dissolving step comprises the active material of spent lead accumulators and wherein the residue of the dissolving step is subjected to desulphurisation by carbonation and subsequent acid treatment.

13. A method of dissolving a material containing lead in order to prepare said material for electrochemical deposition of metallic lead, said method comprising:
   dissolving the lead contained in the material with the use of an acid electrolyte in the presence of a redox couple having, between its oxidised and reduced oxidation states, a potential such as to reduce lead dioxide and to oxidise lead, said material being selected from the group consisting of a material including lead dioxide, a material including metallic lead, and a material including lead dioxide and metallic lead.

* * * * *